US012605813B2

(12) United States Patent
Sandoval et al.

(10) Patent No.: US 12,605,813 B2
(45) Date of Patent: Apr. 21, 2026

(54) PUMP PLUG REMOVAL AND INSTALLATION TOOL

(71) Applicant: Patriot Pump Tools LLC, Banquete, TX (US)

(72) Inventors: Adrian Sandoval, Orange Grove, TX (US); Jesse Guerra, Banquete, TX (US)

(73) Assignee: Patriot Pump Tools LLC, Banquete, TX (US)

( * ) Notice: Subject to any disclaimer, the term of this patent is extended or adjusted under 35 U.S.C. 154(b) by 0 days.

(21) Appl. No.: 18/815,489

(22) Filed: Aug. 26, 2024

(65) Prior Publication Data

US 2025/0108491 A1 Apr. 3, 2025

Related U.S. Application Data

(60) Provisional application No. 63/586,236, filed on Sep. 28, 2023.

(51) Int. Cl.
*B25B 27/02* (2006.01)

(52) U.S. Cl.
CPC .................................. *B25B 27/023* (2013.01)

(58) Field of Classification Search
CPC ............. B25B 27/023; Y10T 29/53683; Y10T 29/5687; Y10T 29/53796; Y10T 29/53848
USPC ................................... 29/239, 240, 244, 256
See application file for complete search history.

(56) References Cited

U.S. PATENT DOCUMENTS

| | | | | |
|---|---|---|---|---|
| 5,616,095 | A * | 4/1997 | Pruitt | F16H 1/32 475/178 |
| 6,192,566 | B1 * | 2/2001 | Dunum | F16D 65/0043 29/256 |
| 9,302,380 | B2 | 4/2016 | Weaver | |
| 10,465,680 | B1 | 11/2019 | Guerra | |
| 10,570,896 | B1 | 2/2020 | Guerra et al. | |
| 11,149,855 | B2 | 10/2021 | Guerra et al. | |
| 11,173,590 | B2 | 11/2021 | Tyler | |
| 2011/0030512 | A1 * | 2/2011 | Begnaud, Jr. | E21B 19/164 166/380 |

(Continued)

FOREIGN PATENT DOCUMENTS

WO 2015175303 11/2015

*Primary Examiner* — Sarang Afzali
*Assistant Examiner* — Darrell C Ford
(74) *Attorney, Agent, or Firm* — Scheef & Stone, LLP; Robin L. Barnes; Mike Schofield

(57) ABSTRACT

Plug removal and installation tools and methods of operating such to remove suction port plugs and discharge port plugs from a fluid end on a pump (e.g., hydraulic fracturing positive displacement pump) and to insert new plugs are disclosed. The plug removal tool includes a reaction bar assembly, a drive assembly, and a threaded rod assembly. The plug removal tool may be operated by rotating the drive assembly using a high torque, powered impact tool to reduce the time, labor, and fatigue associated with manually removing plugs from a pump using a traditional manually operated plug removal tool. The drive assembly is rotatable independently of the threaded rod assembly and reaction bar assembly. Rotation of the drive assembly results in linear movement of the threaded rod assembly to extend and retract the threaded rod assembly relative to the drive assembly and reaction bar assembly.

20 Claims, 11 Drawing Sheets

(56) References Cited

U.S. PATENT DOCUMENTS

| | | | | |
|---|---|---|---|---|
| 2011/0173814 | A1 | 7/2011 | Patel | |
| 2015/0083981 | A1 * | 3/2015 | Kruger | B25B 27/023 269/287 |
| 2024/0227140 | A1 * | 7/2024 | Andrews | B25B 27/023 |

* cited by examiner

PUMP PLUG REMOVAL AND INSTALLATION TOOL

CROSS-REFERENCE TO RELATED APPLICATIONS

This application claims priority to U.S. Provisional Patent Application No. 63/586,236 filed on Sep. 28, 2023 by Adrian Sandoval et al., and entitled “Pump Plug Removal and Installation Tool,” the disclosure of which is hereby incorporated by reference in its entirety.

FIELD OF THE INVENTION

The present disclosure relates generally to a plug tool for removing and installing access port plugs from positive displacement pumps in a safe and efficient manner. More particularly, the present disclosure relates to a plug removal tool for removing suction and discharge port plugs from hydraulic fracturing equipment, namely from fluid ends of a hydraulic fracturing positive displacement pump, when they need to be replaced and for installing new plugs.

BACKGROUND OF THE INVENTION

In the art of hydraulic fracturing, positive displacement pumps are used to inject a mixture of fluid and proppant at high pressure (5,000-15,000 pounds per square inch) into a wellbore to fracture geological formations and increase their hydraulic conductivity. This is accomplished with pumps that typically comprise a power end with gearing and a crankshaft and a fluid end which houses the wetted and pressurized components. Within the fluid ends, reciprocating plungers change the internal volume of the fluid ends when extending and retracting. When a plunger is retracted, fluid enters an inlet port and passes through an inlet suction valve. When the plunger is extended, the fluid is pressurized, the inlet suction valve closes, and the pressurized fluid forces the discharge valve open, forcing the pressurized fluid out of the fluid end through a discharge outlet.

Each suction and discharge valve assembly has an access port so that components can be repaired and replaced. In order to properly control the internal volume of the pump, the access ports are sealed with an elastomeric seal on a plug that is driven tightly into the access ports. The tightly fit seal necessitates that a mechanical plug puller be used to generate the required force to remove the plug. These mechanical plug pullers are typically made of a bar that reacts against a face of the fluid end, a threaded rod, and a hexagonal nut on the threaded rod that rotates against the bar and transfers rotational movement of the nut into linear movement of the threaded rod. The threaded rods will have a tip that matches an internal thread on the center of the plugs being removed. Common hydraulic fracturing pumps typically have plugs with 1.00"-8 UNC internal threads to facilitate their removal.

Standard commercially available mechanical plug pullers require the user to forcefully rotate the handle as many as seven or more full revolutions to remove each plug and seven or more reverse revolutions to restore the tool to its original position. A typical fluid end may have as many as ten plugs that must be removed, requiring a total of 140 or more manual rotations to be performed by the user. The design of standard commercially available mechanical plug pullers does not allow them to be driven by power tools, making the task of removing the plugs cumbersome and time consuming, while also resulting in user fatigue and increased potential for user injury. The industry therefore continues to demand innovative ways to safely and effectively remove plugs from common hydraulic fracturing equipment.

SUMMARY OF THE INVENTION

According to one preferred embodiment, a tool for removing or installing a plug in a fluid end of a pump comprises a reaction bar assembly, a drive assembly, and a threaded rod assembly. The drive assembly is configured to be rotated by an external power device or tool, such as an impact driver. The threaded rod assembly is configured to be connectable to the plug and to move linearly between a forward extended position and a rearward retracted position relative to the drive assembly and the reaction bar assembly. The reaction bar assembly is configured to prevent the threaded rod assembly from rotating when the drive assembly rotates.

According to another preferred embodiment, the reaction bar assembly and threaded rod assembly may be rotated together, independently of the drive assembly. In certain embodiments, the reaction bar assembly may be configured to engage with studs on the fluid end to prevent movement of the reaction bar assembly relative to the fluid end during use of the tool and account for some newer style fluid ends that are manufactured with uneven top surfaces.

According to another preferred embodiment, a portion of the drive assembly comprises threads that engage with corresponding threads on a threaded rod in the threaded rod assembly, to allow linear movement of the threaded rod when the drive assembly rotates. According to still another preferred embodiment, the threaded rod also comprises flat surfaces adjacent threaded surfaces. The flat surfaces are configured to engage with corresponding flat surfaces on a bore portion of the reaction bar assembly to prevent rotation of the threaded rod within the bore portion, effectively locking rotation of the threaded rod to the reaction bar assembly.

According to another preferred embodiment, the tool further comprises a handle connected to the drive assembly and the reaction bar assembly. Preferably, the handle is configured to rotate independently of the drive assembly. In another preferred embodiment, the handle is also configured to rotate independently of the reaction bar assembly. In still another preferred embodiment, the handle is configured to rotate together with the reaction bar assembly.

According to still another preferred embodiment, the reaction bar assembly comprises a rectangular body and a central core. Preferably, the rectangular body is elongated with openings on right and left sides of the central core. The central core comprises the bore portion having the flat surfaces that engage with the flat surfaces on the threaded rod. In another preferred embodiment, the central core comprises a hub and an anti-rotation plate. The rectangular body and/or the openings in the rectangular body may be configured to engage with studs on the fluid end to substantially prevent movement and maintain positioning of the reaction bar assembly relative to the fluid end during use of the tool.

According to another preferred embodiment, the tool comprises a handle and the reaction bar assembly comprises the core, but not the rectangular body. In this embodiment, the handle may be manually held in position during rotation of the drive assembly with the external power device to maintain positioning of the handle and reaction bar assembly relative to the fluid end during use of the tool.

According to one preferred method of using a tool to remove or install a plug from a fluid end, the method comprises connecting the threaded rod to the plug, actuating the external power device to rotate the drive assembly in a counterclockwise direction to extended the threaded rod forwardly or in a clockwise direction to retract the threaded rod rearwardly, as desired, to move the plug out of or into position in the fluid end, and then disconnecting the threaded rod from the plug.

According to another preferred method, the method further comprises aligning the rectangular body and/or the openings of the reaction bar assembly with studs on the fluid end to maintain positioning of the tool relative to the fluid end during rotation of the drive assembly. According to another preferred embodiment, the method comprises manually holding the handle of the tool to maintain positioning of the tool relative to the fluid end during rotation of the drive assembly.

Tools and methods of using the tools to remove or install a plug according to preferred embodiments of the invention provide advantages over prior art manually operated tools. Plugs may be removed or installed much faster using an external power device to drive rotation of the drive assembly compared to manually driven prior art tools. Preferred embodiments also reduce strain, fatigue, and potential for injury on the user or operator of the tool compared to manually driven prior art tools.

BRIEF DESCRIPTION OF THE DRAWINGS

For a more complete understanding of the present disclosure and so that the manner in which the features and advantages of the preferred embodiments can be understood in more detail, reference is now made to the following brief description, taken in connection with the accompanying drawings and detailed description.

The use of the same reference symbols in different drawings indicates similar or identical items.

DETAILED DESCRIPTION OF PREFERRED EMBODIMENTS

Figure 1A:
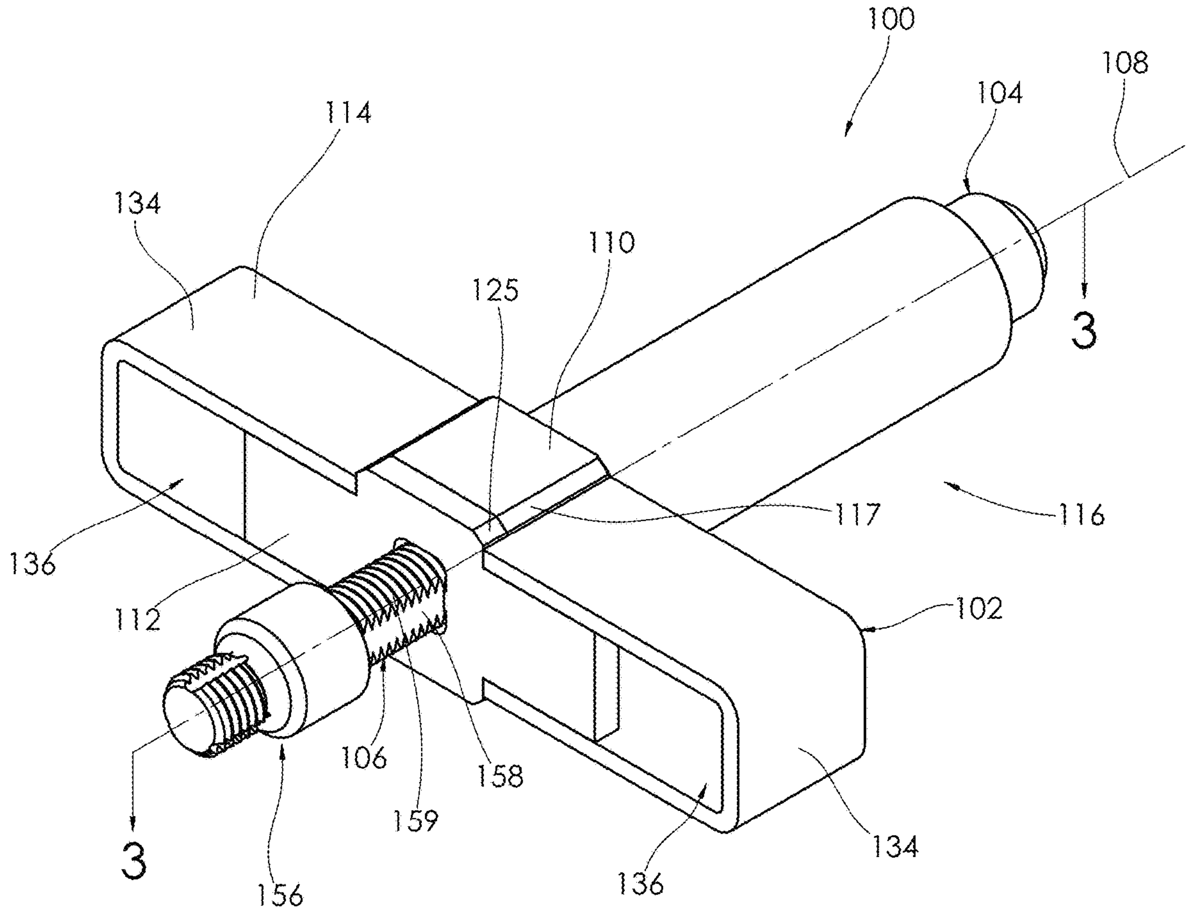
FIG. 1A shows an oblique, forward end perspective view of a plug removal tool according to a preferred embodiment of the disclosure.
Figure 1B:
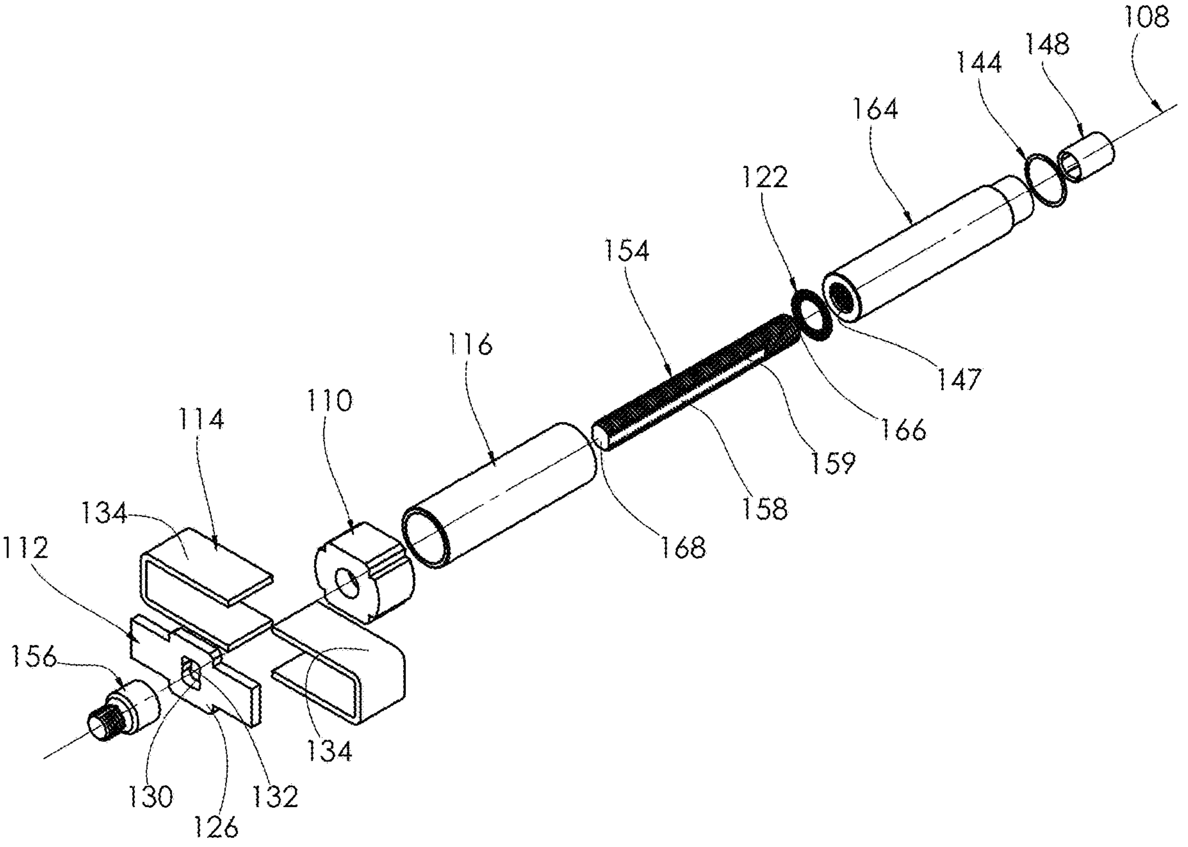
FIG. 1B shows an oblique exploded view of the plug removal tool of FIG. 1A.
Figure 1C:
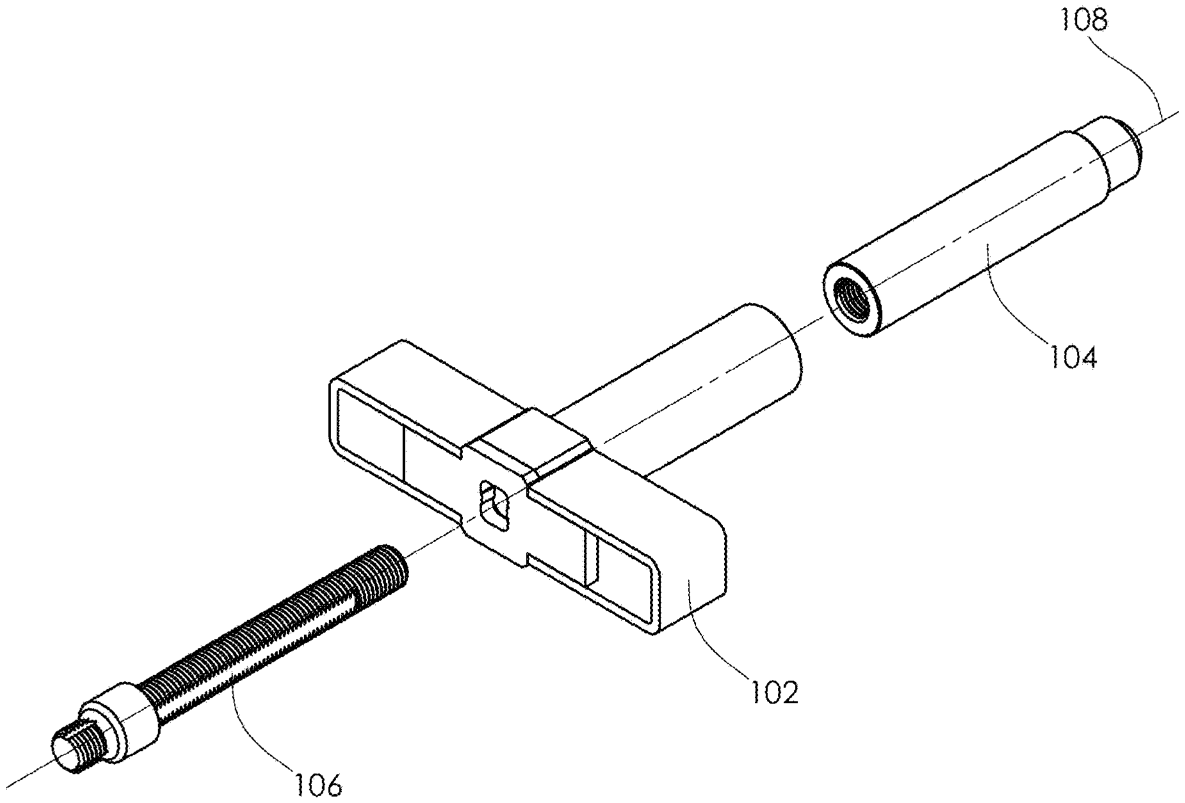
FIG. 1C shows an oblique, partially exploded view of the plug removal tool of FIGS. 1A and 1B.
Figure 2:
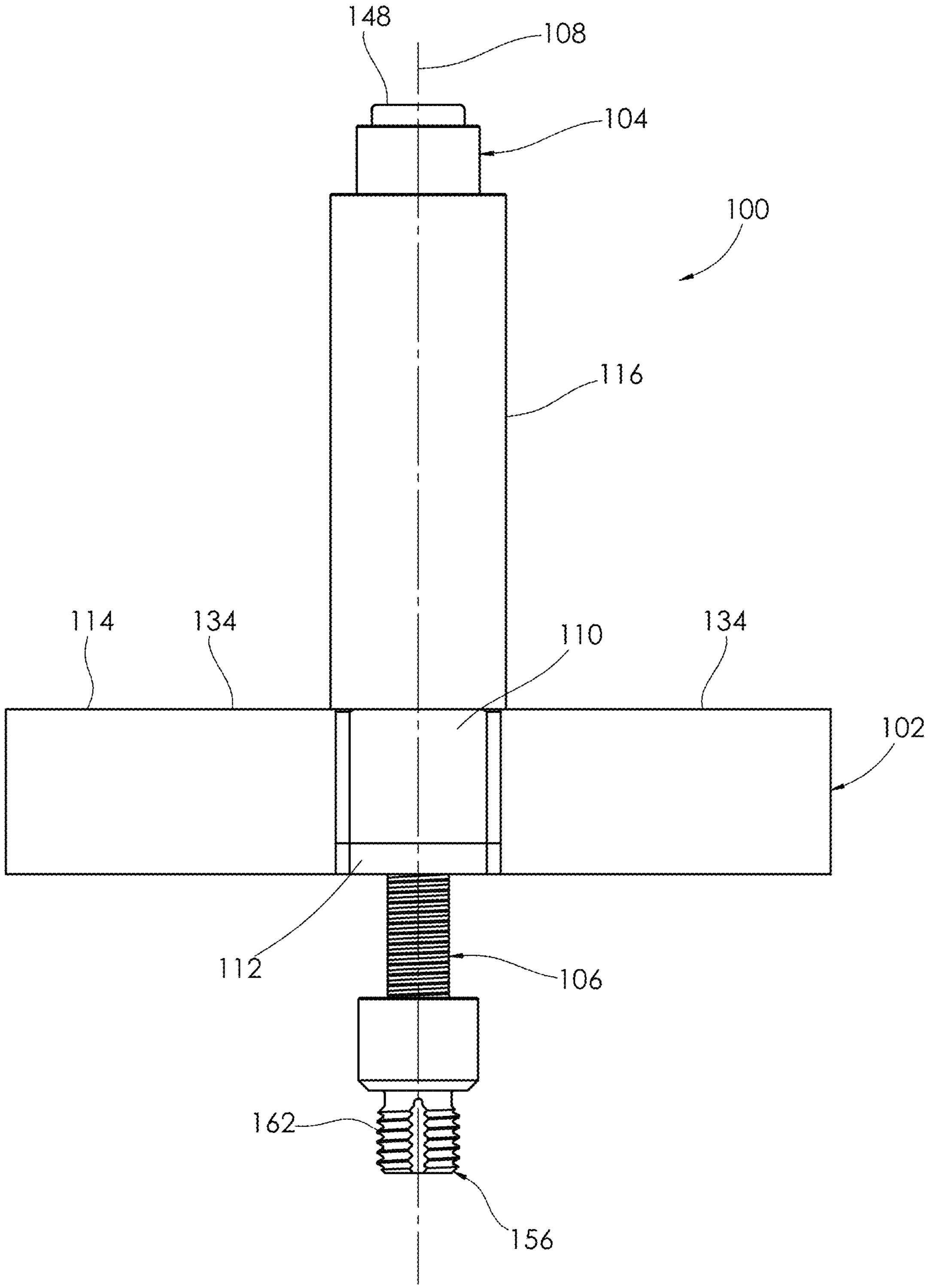
FIG. 2 shows an orthogonal side elevation view of the plug removal tool of FIGS. 1A to 1C.
Figure 3:
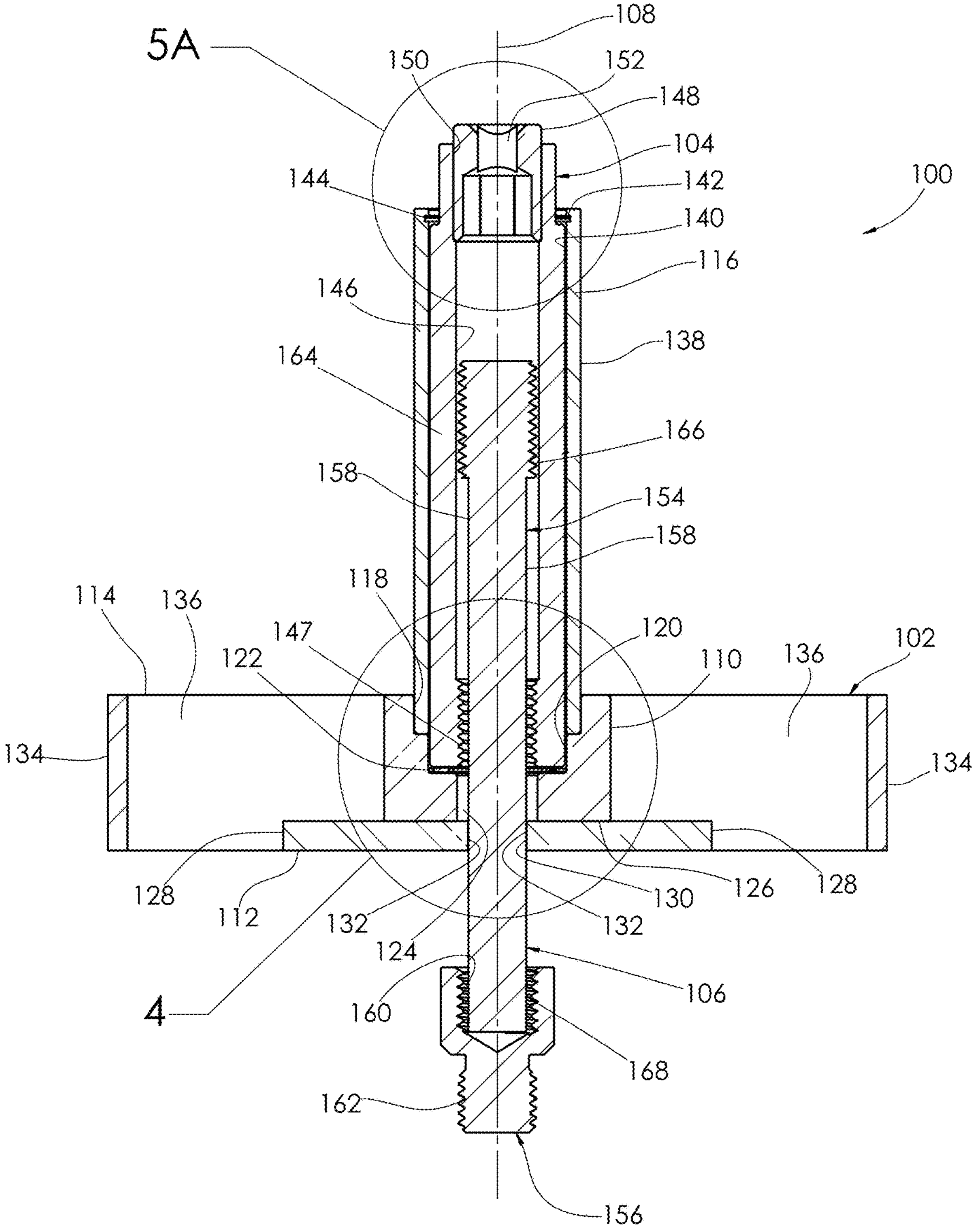
FIG. 3 shows a cross-sectional side elevation view of the plug removal tool according to FIGS. 1A to 1C.
Figure 5A:
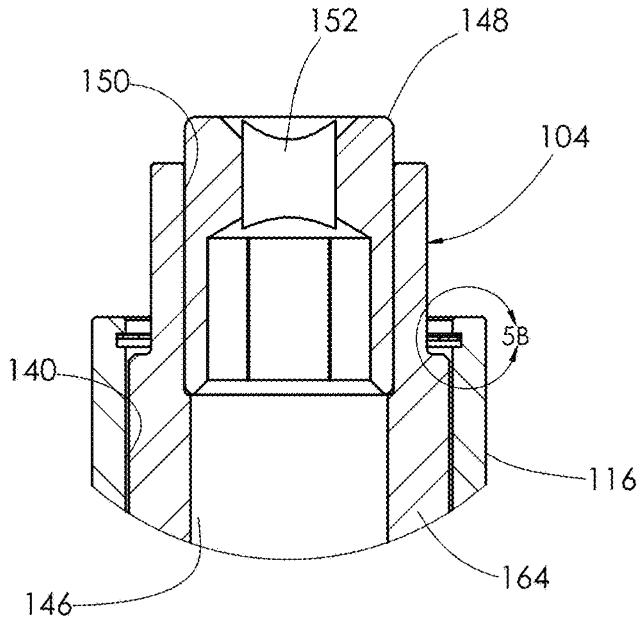
FIG. 5A shows an enlarged view of another portion of the plug removal tool of FIG. 3.
Figure 5B:
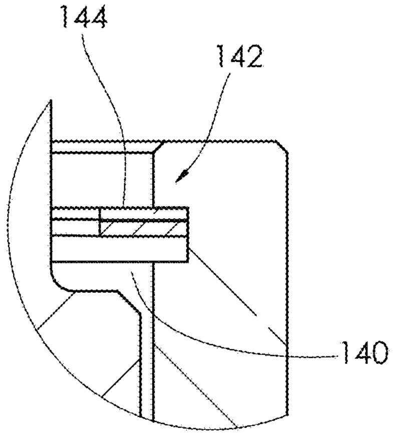
FIG. 5B shows an enlarged view of portion of the plug removal tool of FIG. 5A.
Figure 4:
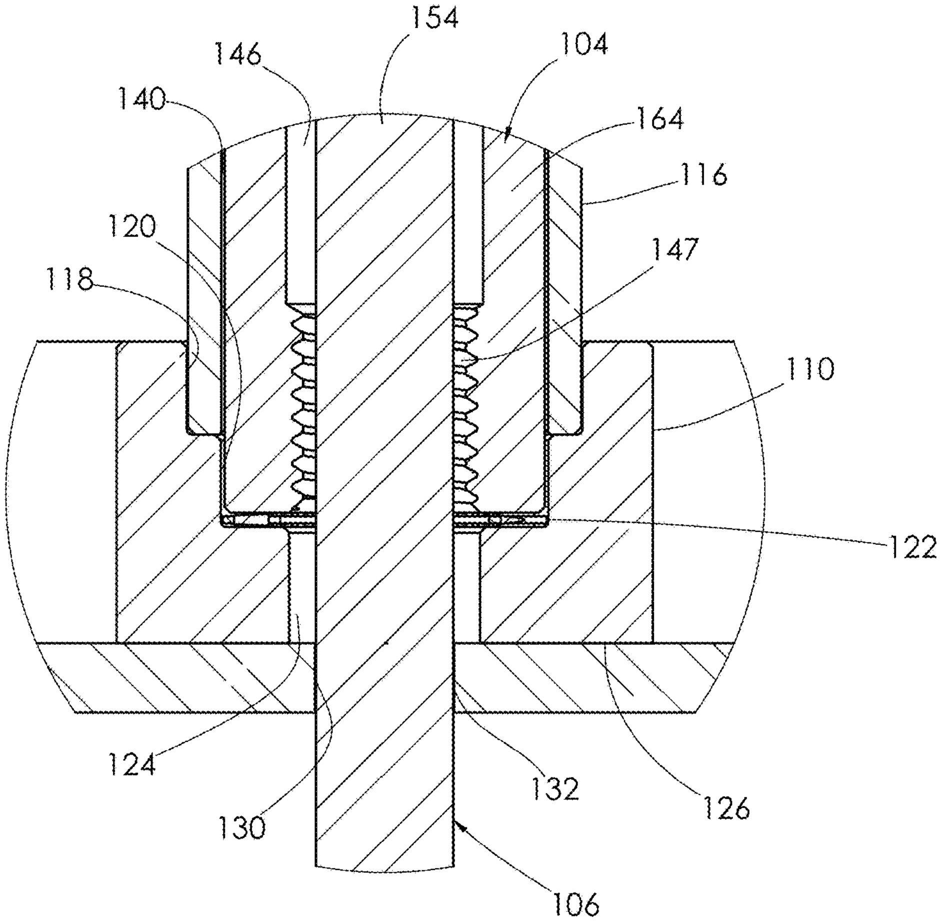
FIG. 4. shows an enlarged view of a portion of the plug removal tool of FIG. 3.
Figure 6:
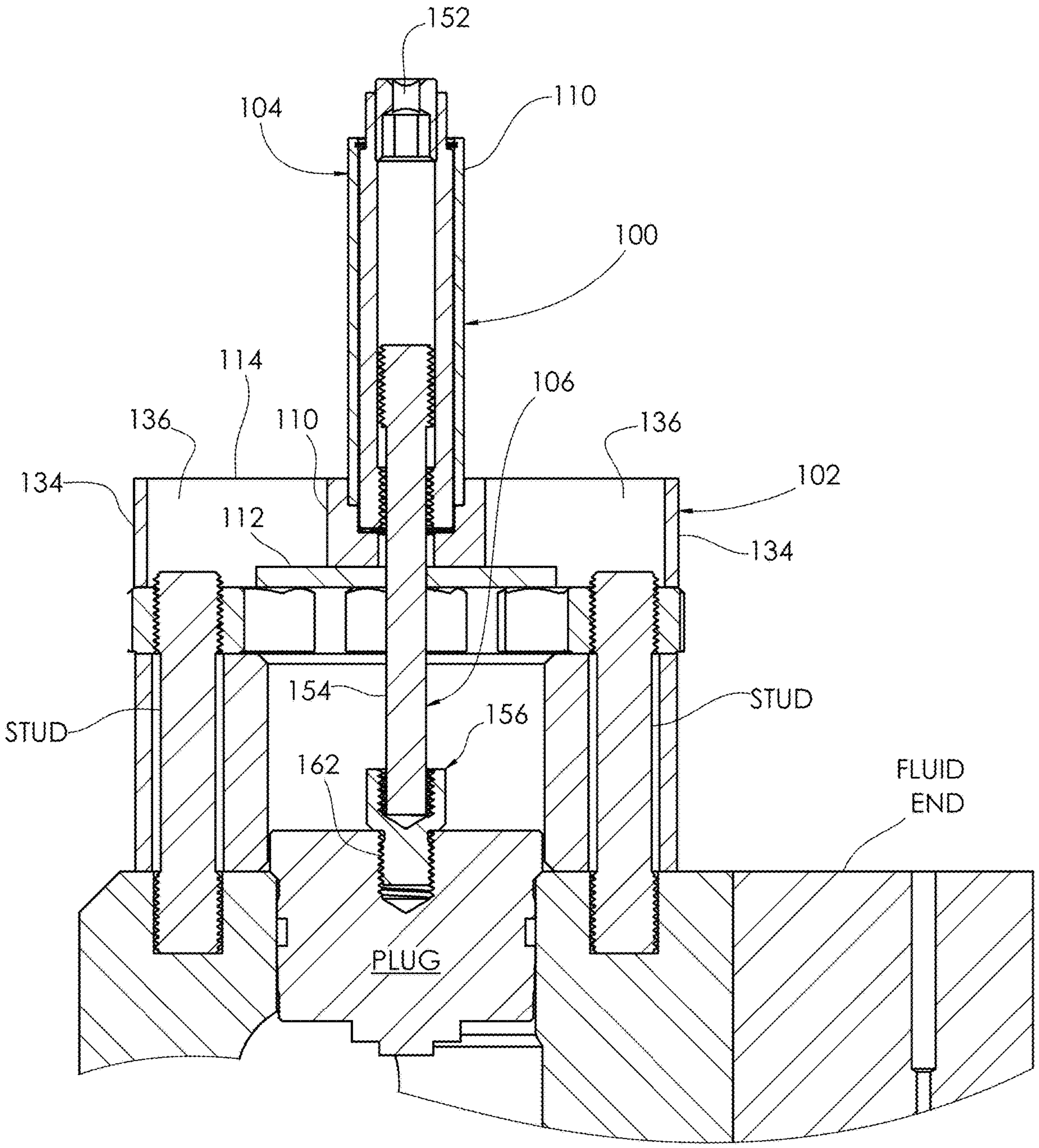
FIG. 6 shows a cross-section side elevation view of the plug removal tool according to FIG. 3 as inserted into a typical plug for a fluid end of a positive displacement pump.
Figure 7:
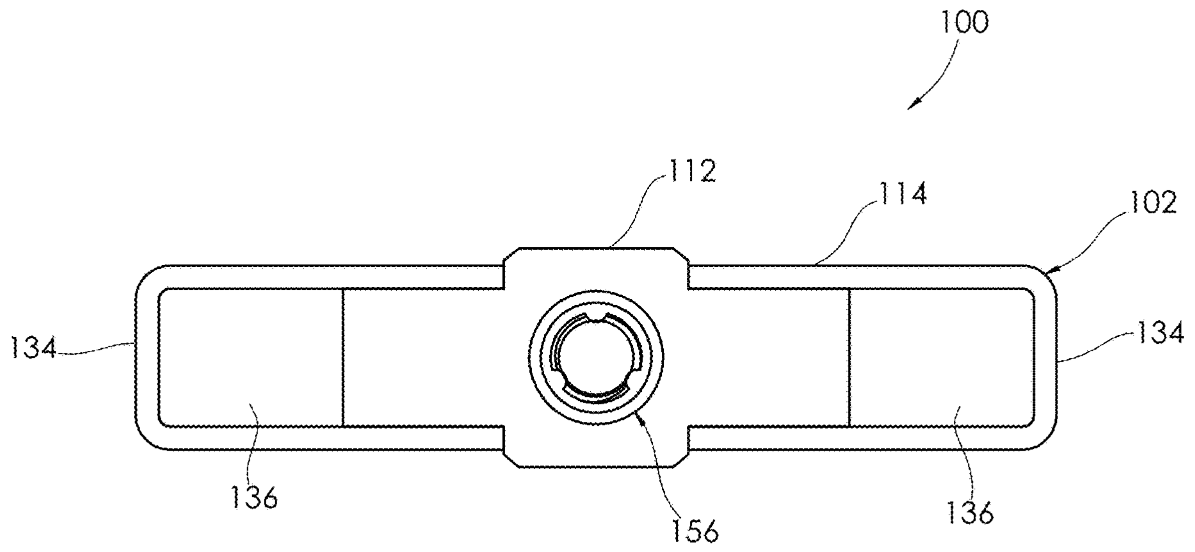
FIG. 7 shows a front-end elevation view of the plug removal tool of FIGS. 1A to 1C.
Figure 8:
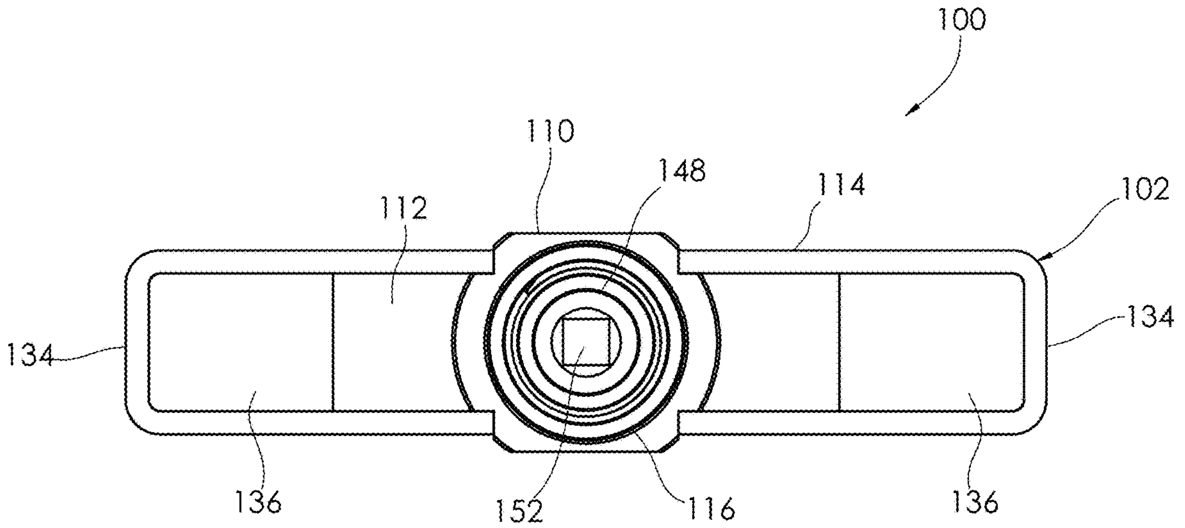
FIG. 8 shows a rear end elevation view of the plug removal tool of FIGS. 1A to 1C.
Figure 9:
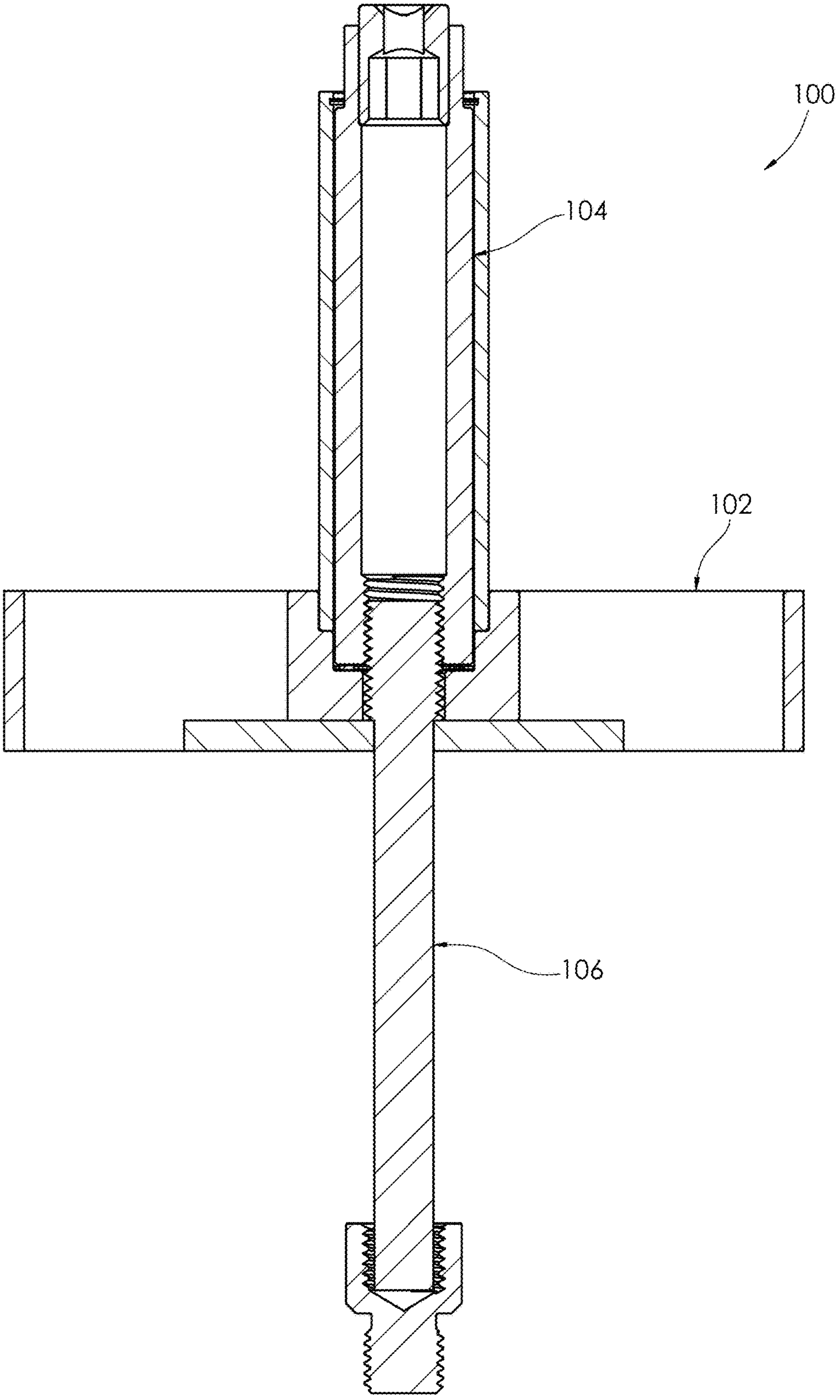
FIG. 9 shows a cross-sectional side elevation view of the plug removal tool of FIG. 3 shown in a fully extended position.
Figure 10:
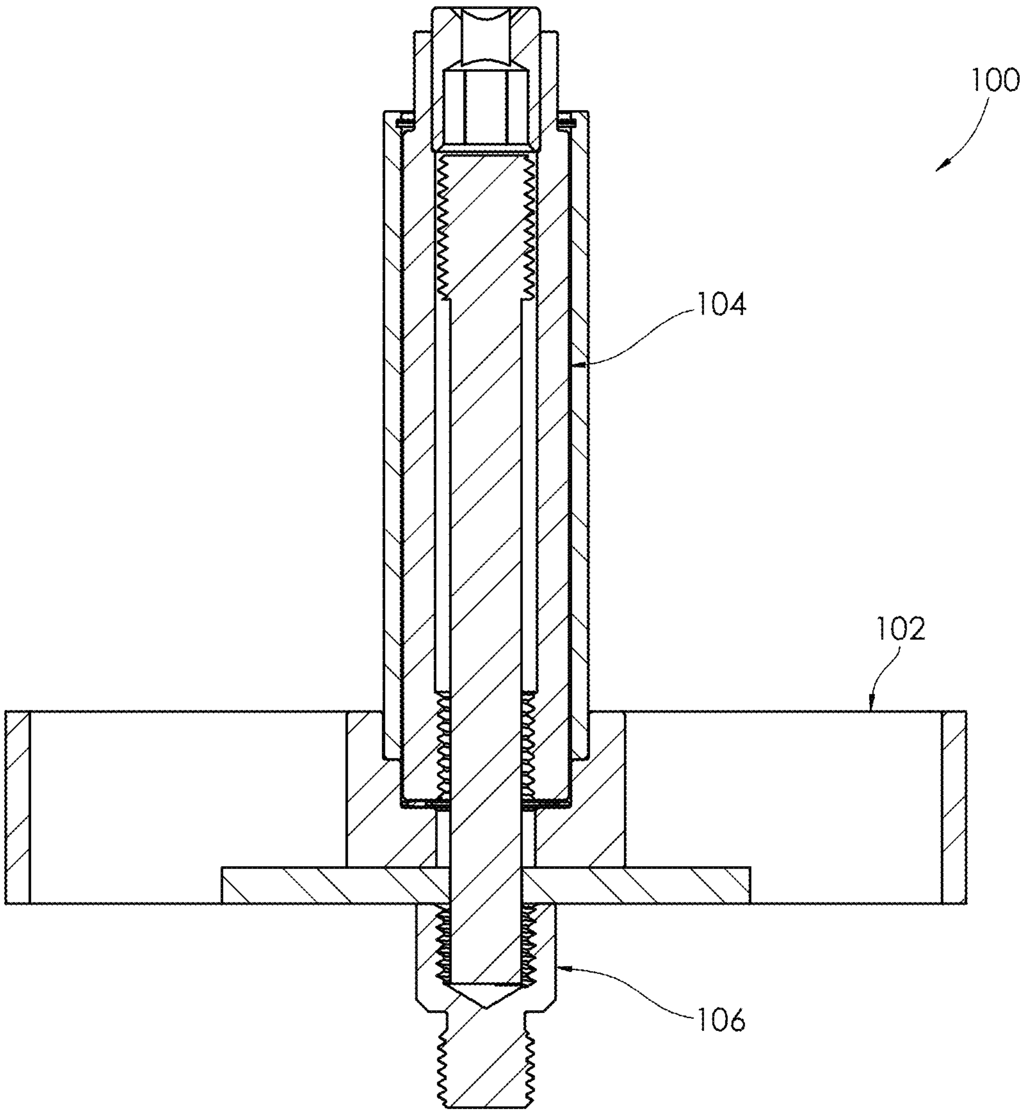
FIG. 10 shows a cross-sectional side elevation view of the plug removal tool of FIG. 3 shown in a fully retracted position.

Referring now to FIGS. 1A-10, a plug removal tool 100 is shown according to a preferred embodiment of the disclosure. The description of tool 100 herein generally refers to tool 100 as a "removal" tool, but it may also be used as an installation tool as will be understood by those of ordinary skill in the art. As used herein, references to forward, front, and the like refer to a direction generally from a drive socket 152 toward a plug fitting 156 (as shown in FIG. 3) or a surface facing toward a pump plug being removed when tool 100 is in use. As used herein, references to rearward, rear, and the like refer to a direction generally from a plug fitting 156 toward a drive socket 152 (as shown in in FIG. 3) or a surface facing away from a pump plug being removed when tool 100 is in use. The plug removal tool 100 preferably comprises a reaction bar assembly 102, a drive assembly 104, and a threaded rod assembly 106 having a central longitudinal axis 108.

A reaction bar assembly 102 preferably comprises a central hub 110, an anti-rotation plate 112, a reaction bar 114, and a handle 116. In some embodiments, the components of the reaction bar assembly 102 may be formed from carbon steel, stainless steel, or any other suitable material. In some embodiments, the components of the reaction bar assembly 102 may be welded together to form a unitary component. In some embodiments, some or all of the components of the reaction bar assembly 102 may be formed from a unitary piece of material, such as metal, plastic, or composite material. In some embodiments, the reaction bar assembly 102 may be formed by additive manufacturing, machining, molding, or any other suitable processes.

The hub 110 is preferably a central connecting piece to which the anti-rotation plate 112, the reaction bar 114, and the handle 116 are connected or attached. The hub 110 may comprise a substantially square or rectangular cross-sectional shape as viewed along the central axis 108. In some embodiments, the hub 110 may comprise chamfered or rounded front and/or rear edges 117.

The hub 110 preferably comprises a first counterbore 118 disposed in a top surface of the hub 110. The first counterbore 118 may be configured to receive a portion of the handle 116. The hub 110 preferably comprises a second counterbore 120 that is smaller than the first counterbore 118 and that extends from the first counterbore 118. The second counterbore 120 may be configured to at least partially receive the drive assembly 104 and comprise a clearance fit to allow the drive assembly 104 to rotate within the second counterbore 120. In some embodiments, the second counterbore 120 may be configured to receive a bearing 122 (e.g., thrust bearing) to allow the drive assembly 104 to freely rotate during operation.

The hub may also comprise a central bore 124 that extends from the second counterbore 120 through a bottom surface of the hub 110. The central bore 124 may comprise a clearance fit with the threaded rod assembly 106 to allow axial movement of the threaded rod assembly 106 along the central axis 108 with respect to the reaction bar assembly 102. The first counterbore 118, the second counterbore 120, and the central bore 124 of the hub 110 may be axially aligned with the central axis 108.

The anti-rotation plate 112 preferably comprises a base 126 having a substantially similar cross-sectional shape as the bottom surface of the hub 110 and reaction tabs 128 extending from the base 126 in opposing left and right directions and orthogonally to the central axis 108. The anti-rotation plate 112 may generally be affixed to the bottom surface of the hub 110. In some embodiments, the anti-rotation plate 112 may be welded to the hub 110. In some embodiments, the anti-rotation plate 112 and the hub 110 may comprise a unitary component and be formed by additive manufacturing, machining, molding, or any other suitable processes. In some embodiments, the base 126 may comprise chamfered or rounded front and/or rear edges 125.

The anti-rotation plate 112 may also comprise a central bore 130 that is axially aligned with the central axis 108 and the central bore 124 of the hub 110. The central bore 130 may comprise a complementary cross-sectional shape to the threaded rod assembly 106. The central bore 130 may comprise a clearance fit with the threaded rod assembly 106 to allow axial movement of the threaded rod assembly 106 along the central axis 108 with respect to the reaction bar assembly 102. More particularly, the central bore 130 may comprise a round cross-sectional shape having flat truncated sides 132 adjacent to each of the reaction tabs 128. The flat truncated sides 132 of the central bore 130 may be complementary to machined flat surfaces 158 on the threaded rod assembly 106 to restrict rotational movement of the threaded rod assembly 106 during operation.

The reaction bar 114 preferably comprises two substantially U-shaped rectangular bars 134 that are affixed to the hub 110. In some embodiments, the reaction bar 114 may be welded to the hub 110. In some embodiments, the reaction bar 114 may also be welded to the anti-rotation plate 112. More particularly, in some embodiments, the reaction bar 114 may be welded to the base 126 and/or the reaction tabs 128 of the anti-rotation plate 112. In some embodiments the reaction bar 114 and the hub 110 and/or the anti-rotation plate 112 may comprise a unitary component and be machined from a solid piece of material. The reaction bar 114 may also comprise openings 136 formed between the hub 110 and outer ends of the U-shaped bars 134. In some embodiments, the reaction tabs 128 of the anti-rotation plate 112 may extend along the openings 136. In some embodiments, the openings 136 may be configured to fit over studs on bolt-together fluid ends of a hydraulic fracturing positive displacement pump and prevent rotation of the reaction bar assembly 102 during operation.

The handle 116 preferably comprises a cylindrical shape having an outer surface 138 and an inner bore 140. The handle 116 may be at least partially disposed within the first counterbore 118 of the hub 110. In some embodiments, the outer surface 138 may be mated to an inner surface of the first counterbore 118. The handle 116 may also be affixed to the hub 110 so that rotating the handle 116 rotates the entire reaction bar assembly 102. In some embodiments, the handle 116 may be welded to the hub 110. In alternative embodiments, the handle 116 may be threaded into the first counterbore 118 of the hub 110 and may optionally be affixed with thread lock adhesive or welded to the hub 110. In some embodiments, at least a portion of the outer surface 138 may comprise a coating (e.g., rubber, tape) that enhances a user's grip on the handle 116 during operation.

The inner bore 140 of the handle 116 may be configured to receive the drive assembly 104. The inner bore 140 preferably comprises a clearance fit with the drive assembly to allow the drive assembly 104 to freely rotate during operation. In some embodiments, the handle 116 may also comprise an upper or rear flange 142. The upper flange 142 may comprise a groove configured to accept a retaining ring 144 that secures the drive assembly 104 within the handle 116, between the bearing 122 and the retaining ring 144, and prevents axial movement of the drive assembly 104 substantially aligned with or along axis 108 within the handle 116, while allowing free rotation of the drive assembly 104 substantially about axis 108 within the handle 116 during operation.

The drive assembly 104 preferably comprises a cylindrical shape that is complementary to and comprises a clearance fit with the inner bore 140 of the handle 116. As stated, the drive assembly 104 may be at least partially disposed within the handle 116 and be allowed to freely rotate within the handle 116. The drive assembly 104 may be at least partially disposed within the second counterbore 120 and adjacent to the bearing 122 to allow the drive assembly 104 to freely rotate within the second counterbore 120 and the handle 116. Accordingly, the drive assembly 104 may be captured between the bearing 122 disposed in the second counterbore 120 of the hub 110 and the retaining ring 144 and/or upper flange 142 of the handle 116.

The drive assembly 104 preferably comprises a hollow shaft 164 and a drive fitting 148. Hollow shaft 164 preferably comprises a threaded inner bore 147 disposed at or near a forward end of shaft 164, a bore 150 disposed at or near a rearward end of shaft 164, and a central bore 146 disposed between threaded inner bore 147 and bore 150. Bores 146 and 150 are preferably non-threaded. Bore 150 is configured to receive drive fitting 148. The central bore 146 may be sized slightly smaller in width or diameter than rear bore 150 to provide a stop for drive fitting 148, to prevent drive fitting 148 from substantially moving into central bore 146. The threaded rod assembly 106 may generally be threaded into the threaded inner bore 147 of the drive assembly 104, such that rotation of the drive assembly 104 within the handle 116 causes linear extension and retraction (depending on direction of rotation) of the threaded rod assembly 106 with respect to the reaction bar assembly 102 and the shaft 164. As such, the threaded inner bore 147 may comprise a thread pitch that is complementary to the threaded rod assembly 106. In some embodiments, the thread pitch may be 1.00-8 UNC. However, in other embodiments, the thread pitch may comprise any other thread pitch or thread type based on the size and application of the plug removal tool 100.

In some embodiments, the drive fitting 148 may be welded to the rear bore 150 to form a unitary component. However, in some embodiments, the drive assembly 104 may comprise a unitary component and be formed by additive manufacturing, machining, molding, or any other suitable processes. In some embodiments, some or all of the components of the drive assembly 104 may be formed from a unitary piece of material, such as metal, plastic, or composite material. According to other embodiments, drive fitting 148 and rear bore 150 may be configured so that drive fitting 148 is removably connectable to bore 150 and the two rotate together when connected. A pair of aligned apertures may be provided on drive fitting 148 and bore 150 to allow the two to be removably connected via an insertable clip, pin, screw, bolt, or other connector. Most preferably the placement of the aligned apertures does not interfere with insertion of a drive end of an external power tool into drive socket 152. Use of a removably connectable drive fitting 148 allows for connection of drive fittings 148 having different internal or external shapes and/or sizes to accommodate various external power tools having different shapes and/or sizes of drive ends.

The drive fitting 148 preferably comprises a drive socket 152 that allows for the selective attachment or engagement of a powered external device or tool to rotate the drive assembly 104. Most preferably, the powered external device (or external power tool or similarly worded device) comprises an electric, solar, or battery-operated impact driver, a pneumatic impact driver, or any other electrically or pneumatically driven tool that is capable of providing sufficient torque to rotate drive assembly 104. Preferred external devices are capable of providing torque in a range of 200 to 1500 ft-lbs. without requiring any manual or human force to drive rotation. Manual force by a human may still be used to hold an external device in position relative to tool 100 and to apply some forward force on an external device to ensure that the external device remains engaged with tool 100 and does not rotate out of the operator's or user's hands; however, manual or human force is not required, and preferably not used, to rotate any portion of tool 100 once tool 100 is connected to a plug to be removed. Manual force may be used in connecting and disconnecting a plug fitting 156 from a plug as further described below. In some embodiments, the drive socket 152 may comprise a one-half inch square drive socket. In some embodiments, the drive socket 152 may comprise a hex drive socket, a six-point star screw drive (e.g., TORX™), or any other suitable drive socket shape. In other embodiments, the drive fitting 148 may comprise an outer profile that accepts a standard socket over the outer profile of the drive fitting 148 (e.g., ¾" socket, or any other suitable size). Accordingly, when a driving end of the external device is inserted into the drive socket 152, operation of the external device imparts rotation to the drive assembly 104 to selectively cause linear extension and retraction of the threaded rod assembly 106 (with the fully extended and fully retracted positioning shown in FIGS. 9-10).

The threaded rod assembly 106 preferably comprises a threaded rod 154 and a plug fitting 156. Portions of threaded rod 154 extend from shaft 164 inside bore 146, through bores 147, 124, and 130, and forwardly of anti-rotation plate 112. Threaded rod 154 is preferably at least partially retained inside shaft 164 at a rear end, with a forward end extending forwardly of anti-rotation plate 112.

The threaded rod 154 is preferably configured with a clearance fit within the central bore 124 of the hub 110 and central bore 130 of anti-rotation plate 112 to allow axial (or linear) movement of the threaded rod assembly 106 substantially along the central axis 108 between extended and retracted positions with respect to the reaction bar assembly 102. The threaded rod 154 preferably comprises a rear end 166 portion and forward end 168 portion. Disposed between end portions 166 and 168, at least a portion of a length of threaded rod 154 comprises a partially threaded surfaces 159 disposed adjacent machined surfaces 158 that are substantially flat. Most preferably, at least a portion of the partially threaded surface 159 of rod 154 is threaded along its entire length. The partially threaded surface 159 disposed along a length of rod 154 engage with corresponding threads on inner bore 147 of shaft 164. Machined flat surfaces 158 may be substantially complementary to the flat truncated sides 132 of the central bore 130 of the anti-rotation plate 112, which may cooperate to restrict rotational movement of the threaded rod assembly 106 during operation. Preferably, flat surfaces 158 are configured to abut flat truncated sides 132 on bore 130 to prevent threaded rod 154 from rotating around axis 108 independently of reaction bar assembly without preventing forward or rearward linear movement of threaded rod 154 along or substantially aligned with axis 108. The machined flat surfaces 158 of the threaded rod 154 are machined only partially along the outer surface of the threaded rod 154, leaving threaded portion 159 on other portions of the outer surface. Some portions of threaded portions 159, adjacent flat surfaces 158 on threaded rod 154, are preferably always engaged with corresponding threads on bore 147, allowing threaded rod assembly 106 to move axially when shaft 164 is rotated. Thus, when shaft 164 is rotated, threaded rod assembly 106 moves forwardly or rearwardly (depending on the direction of rotation for shaft 164) but threaded rod assembly 106 does not itself rotate unless reaction bar assembly 102 is rotated by a user.

In one preferred embodiment, a rear end portion 166 of the threaded rod 154 is not machined with flat surfaces, such that rear end 166 is substantially cylindrical and fully threaded around its circumference to prevent the end 166 of the threaded rod 154 from passing forwardly through the central bore 130 in anti-rotation plate 112. Thus, the anti-rotation plate 112 also retains the threaded rod 154 to be at least partially within the reaction bar assembly 102 and at least partially within the drive assembly 104. In an alternative embodiment, forward bore 147 may be sized with a diameter smaller than a width or diameter of central bore 146 to provide a stop at a rear end of bore 147, to prevent fully threaded rear end portion 166 of threaded rod 154 from moving substantially into bore 147 and retain threaded rod 154 at least partially within drive assembly 104. In an additional alternative embodiment, rear end portion 166 is not fully threaded, but may be sized with a larger width or diameter to prevent forward movement of end 168 through bore 130 or through bore 147. Similar to rear end portion 166, forward end portion 168 is most preferably not machined with flat surfaces, such that forward end 168 is substantially cylindrical and fully threaded around its circumference. The fully threaded forward end 168 allows secure threaded connection between threaded rod 154 and a plug fitting 156. The plug fitting 156 may comprise a threaded stud that is affixed to the threaded rod 154 to form the threaded rod assembly 106. The plug fitting 156 may comprise a female portion 160 that may comprise a thread pitch that is complementary to the threaded rod 154 or at least the forward end 168. In some embodiments, the female portion 160 may be threaded onto the forward end 168. In some embodiments, the female portion 160 of the plug fitting 156 may be welded (with or without also being threadedly connected) to the threaded rod 154 to form a unitary component. In still other embodiments, the threaded rod assembly 106 may comprise a unitary component comprising the threaded rod 154 and plug fitting 156 as a single piece that may be formed by additive manufacturing, machining, molding, or any other suitable processes.

In an embodiment, a fully threaded forward end portion 168 may aid in preventing end 168 of the threaded rod 154 from passing rearwardly through the central bore 130 in anti-rotation plate 112 as the threads will not fit through bore 130. If threaded rod assembly 106 is unitarily formed, then another embodiment comprises an annular lip at a rear end of plug fitting 156 that prevents threaded rod assembly 106 from moving rearwardly through bore 130. In another alternative embodiment, forward end portion 168 is not fully threaded, but may be sized with a larger width or diameter to prevent rearward movement of end 168 through bore 130.

For ease of assembly of the components of tool 100, most preferably, at least one of ends 166, 168 is sized and shaped to fit through each of bores 150, 146, 147, 124, and 130. Most preferably, forward end 168 (with or without plug fitting 156 attached) is sized to fit through bores 150, 146, 147, 124, and 130 so that threaded rod 154 may be insert through the rear end of tool 100 and through each bore during assembly. Most preferably, plug fitting 156 is attached to forward end 168 once it has cleared forwardly through bore 130. When forward end 168 is sized to fit through each of the bores, rear end 166 is preferably sized to only fit through bores 150 and 146 and, optionally, 147 and 124, and be prevented from moving forwardly through bore 130 to retain threaded rod 154 at least partially within shaft 164. Drive fitting 148 is then preferably installed at the rear end of shaft 164 to prevent threaded rod 154 from rearward movement out of shaft 164. In these preferred embodiments, threaded rod 154 is secured at least partially within shaft 164 and cannot be fully removed without disassembling parts of tool 100.

In still other alternative embodiments, forward end portion 168 may be connected to plug fitting 156 by a non-threaded connection, such as a pair of aligned apertures provided on forward end portion 168 and a rear end portion of plug fitting 156 to allow the two to be removably connected via an insertable clip, pin, screw, bolt or other connector. Most preferably the placement of the aligned apertures does not interfere with insertion of a forward end of threaded rod assembly 106 into the fluid end or alignment and engagement of threaded male portion 162 with corresponding threads on the plug. Whether connected by threaded or non-threaded attachment, use of a removably connectable plug fitting 156 allows for connection of plug fittings 156 having different external shapes and/or sizes (such as at threaded male portion 162) to accommodate plugs having different shapes and/or sizes of openings or threads.

The plug fitting 156 may also comprise a threaded male portion 162 extending from the female portion 160. The threaded male portion 162 may comprise a thread pitch that is complementary to a thread pitch of a suction or discharge port of a hydraulic fracturing positive displacement pump. As common in the industry, the thread pitch may be 1.00-8 UNC. However, in other embodiments, the thread pitch may comprise any other thread pitch based on the size and application of the plug removal tool 100 for any given suction or discharge port of a positive displacement pump.

In some embodiments, the plug removal tool 100 may be sized to effectively and efficiently remove suction and discharge port plugs from a positive displacement pump. For example, in some embodiments, plug removal tool 100 may comprise an overall retracted length of about 7.5 to 15 inches, more preferably about 10.00 to 11.75 inches, and most preferably about 11.5 inches and an overall extended length about 12 to 22 inches, more preferably about 16 to 18 inches, and most preferably about 17.50 inches. A stroke length, defined as the difference between the overall extended length and the overall retracted length of the plug assembly tool 100 may be sized beneficially to extract and/or install the suction and discharge port plugs. For example, in some embodiments, the plug removal tool 100 may comprise a stroke of at least 3 inches, at least 4 inches, at least 5 inches, at least 6 inches, at least 6.25 inches, at least 6.5 inches, or even greater depending on the application.

Further, in some embodiments, the reaction bar 114 may comprise an overall length (longest dimension between left and right ends of the two rectangular bars 134 of the reaction bar 114) of at least 5 inches, at least 6 inches, at least 6.25 inches, at least 6.5 inches, at least 6.75 inches, or even greater. In some embodiments, the reaction bar 114 may comprise an overall length of between 6.875 inches and 12.00 inches. However, in some preferred embodiments, the reaction bar 114 may comprise an overall length of about 10.00 inches.

In operation, the plug removal tool 100 may be used to remove suction and discharge port plugs common in positive displacement pumps, such as that typically used in hydraulic fracturing. According to one preferred method of removing a plug using tool 100, an operator or user may first insert plug fitting 156 into a suction or discharge port of fluid end in which a plug needs to be removed for replacement or inspection. Once inserted, the operator begins threading the male portion 162 of the threaded rod assembly 106 into a corresponding threaded female portion on a suction or discharge port plug of a positive displacement pump. This may be accomplished by manually rotating (using human force to drive the rotation) the entire plug removal tool 100 by the handle 116 and/or reaction bar 114. The reaction bar 114 is preferably aligned so that its outer ends are disposed between adjacent studs on the fluid end and its forward surface substantially abuts a surface of the fluid end, most preferably, the forward surface of reaction bar 114 and/or the anti-rotation plate 112 is flush against and in contact with a surface of the fluid end disposed between studs. In some embodiments where the reaction bar 114 engages the studs, the reaction bar 114 may cooperate with the studs to hold the reaction bar 114 in a substantially stationary position during operation of tool 100. The operator may insert a driving end of a powered external driving device into the drive socket 152 to aid in threading male portion 162 into the plug to connect tool 100 to the plug. Positioning of reaction bar 114 may be manually adjusted as needed during the threading of the male portion 162 to align between the studs of the fluid end. Most preferably, manual rotation (using human force to drive rotation), is only utilized during connection of tool 100 to the plug and alignment of reaction bar 114, but is not required and not used during retraction of threaded rod 154 to loosen and remove the plug.

Once tool 100 is connected to the plug, the operator may insert a driving end of a powered external device into drive socket 152 if not already inserted and operate the external device to rotate the drive assembly 104 in a clockwise direction to axially retract the threaded rod assembly 106. As drive assembly 104 is rotated, threaded rod 154 moves in a rearward direction substantially aligned with axis 108. This axial retraction of the threaded rod assembly 106 will continue as the reaction bar assembly 102 presses against the fluid end until the suction or discharge plug is removed, or loosed sufficiently to be removed, from the fluid end and extracted from the pump. Once the plug is out of the fluid end, it can be manually removed, or removed with the aid of the external power tool, from plug fitting 156 by unscrewing the two so that tool 100 can then be used on the next plug needing removal. The use of the external device, such as a powered high torque impact driver or wrench, on the drive assembly 104 significantly accelerates the removal of the plug from the pump and requires minimal physical effort from the operator or user in comparison to traditional manually actuated plug removal tools that rely on human force to rotate the device to remove the plug. The benefits include reducing the amount of time, labor, and fatigue on an operator that is often associated with manually removing plugs from a pump using a traditional manually operated plug removal tool. For example, in a timed comparison of a prior art manually actuated plug remover and a tool 100 according to a preferred embodiment driven by a power impact driver, the use of tool 100 allowed removal of ten plugs in around half the time it took to remove 10 plugs from the same pump using a prior art manual device.

Figure 11:
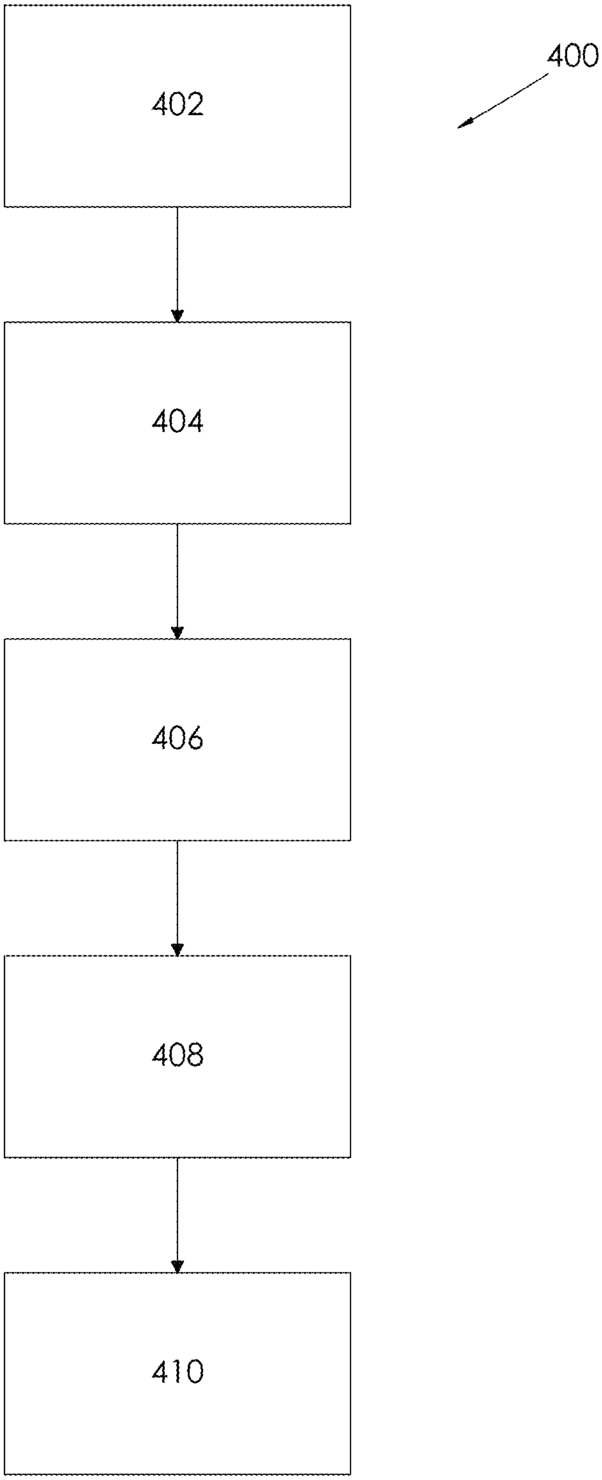
FIG. 11 shows a flowchart of a method of operating a plug removal tool according to a preferred embodiment of the disclosure.

FIG. 11 shows a flowchart of a method 400 of operating a plug removal tool, such as tool 100, according to a preferred embodiment of the disclosure. The method 400 herein is described specifically with reference to the components of a preferred tool 100 as shown in FIGS. 1A-8 herein, but may also be used with other plug removal tools having similar components as will be understood by those of ordinary skill in the art.

The method 400 begins at step 402 by providing a plug removal tool, preferably tool 100, comprising: a reaction bar assembly 102, a drive assembly 104, and a threaded rod assembly 106.

The method 400 may continue at step 404 to connect the tool 100 to a plug of a fluid end that needs to be removed. In some preferred embodiments, the plug may be a suction port plug or discharge port plug of a positive displacement pump, such as that typically used in hydraulic fracturing operations. In some preferred embodiments, step 404 may be accomplished by threading the threaded rod assembly 106 into a plug of a pump and rotating the reaction bar assembly 102 by a handle 116 and/or reaction bar 114 until the reaction bar 114 contacts a fluid end of the pump. Step 404 preferably comprises the following sub-steps: (1) inserting plug fitting 156 into port on a fluid end; (2) aligning plug fitting 156 with a threaded female portion on the plug; (3) threading the threaded male portion 162 into the corresponding threaded female portion of the plug by (a) manually rotating the handle 116 and/or reaction bar 114 or (b) actuating an external device as further described below; (4) prior to or during step 3, aligning reaction bar 114 so that its outer ends are disposed between adjacent studs on the fluid end and its forward surface at least substantially abuts a surface of the fluid end.

The method 400 may continue at step 406 by inserting an external power tool into the drive assembly 104. In some embodiments, this may be accomplished by inserting into a drive socket 152 of the drive assembly 104. Step 406 preferably comprises the following sub-steps: (1) selecting a drive end connection for the external power tool that corresponds to the shape and size of drive socket 152; (2) connecting the correct drive end to the external power tool; (3) inserting the drive end of the external power tool into the drive socket 152; and (4) holding the external device to maintain its drive end in engagement with the drive socket 152.

The method 400 may continue at step 410 by disconnecting tool 100 from the plug. In some embodiments, the method 400 may include rotating the reaction bar assembly 102 in a counterclockwise direction while holding, preferably manually holding, the plug stationary to separate the plug from the plug removal tool 100. Step 410 is preferably substantially the reverse of Step 404. Step 410 preferably comprises the following sub-steps: (1) unthreading the threaded male portion 162 from the corresponding threaded female portion of the plug by (a) manually rotating the handle 116 and/or reaction bar 114 until tool 100 is separated from the plug or (b) actuating the external power tool as previously described, but set to operate to rotate in a reverse direction, until tool 100 is separated from the plug.

The method 400 may continue at step 410 by disconnecting tool 100 from the plug. In some embodiments, the method 400 may include rotating the reaction bar assembly 102 in a counterclockwise direction while holding, preferably manually holding, the plug stationary to separate the plug from the plug removal tool 100. Step 410 is preferably substantially the reverse of Step 404. Step 410 preferably comprises the following sub-steps: (1) unthreading male end 162 from the corresponding threaded female portion of the plug by (a) manually rotating the handle 116 and/or reaction bar 114 until tool 100 is separated from the plug or (b) actuating the external power tool as previously described, but set to operate to rotate in a reverse direction, until tool 100 is separated from the plug.

Tool 100 may similarly be used to install a new plug in the fluid end by substantially reversing the removal steps. Rotation of drive socket 152 in a clockwise direction (such as by reversing the direction of rotation on the external power tool) will cause the threaded rod assembly 106 to be axially extended (in a forward direction) along the central axis 108. Extending in a forward direction will allow a new plug to be inserted and installed in the fluid end. Extending in a forward direction may also be used, as needed, to aid in connecting tool 100 to the plug as part of the removal method (such as in step 404 (1)) to extend the threaded rod 154 and its connected plug fitting 156 sufficiently far into the port to be able to connect to the corresponding female threaded portion on the plug.

Most preferably, plug removal tool 100 and its methods 400 of operation according to preferred embodiment herein do not require any manual or human force to achieve a driving rotation to extend or retract threaded rod 154 once plug fitting 156 is connected to the plug. Manual or human rotational force may be used for connecting and disconnecting plug fitting 156 to the plug, including for aligning reaction bar 114 with studs or other portions of the fluid end. Manual or human force may also be used for linear or axial movement of tool 100 (and external power tool) substantially along or aligned with axis 108 to connect and disconnect tool 100 to the plug and to maintain engagement between tool 100 and external power tool during extension or retraction of threaded rod 154.

It will be appreciated that a plug removal tool 100 and/or a method 400 of operating a plug removal tool 100 disclosed herein may include one or more of the following embodiments:

Embodiment 1. A plug removal tool as disclosed herein.

Embodiment 2. A plug removal tool, comprising: a reaction bar assembly comprising a hub having a central bore therethrough, an anti-rotation plate affixed to a bottom surface of the hub and having a central bore axially aligned with the central bore of the hub, a reaction bar comprising two substantially U-shaped rectangular bars affixed to the hub on each of a left side and a right side of the hub, and a handle disposed at least partially within and affixed to the hub; a drive assembly comprising a threaded inner bore, a nonthreaded upper bore, and a drive fitting disposed in the non-threaded upper bore, wherein the drive assembly comprises a cylindrical shape that is complementary to and comprises a clearance fit with an inner bore the handle, wherein the drive assembly is at least partially disposed within the handle and the hub and allowed to freely rotate within the handle and the hub; and a threaded rod assembly comprising a threaded rod and a plug fitting, wherein the threaded rod is threaded into the inner bore of the drive assembly and extends from the inner bore through the central bores of the hub and the anti-rotation plate; wherein rotation of the drive assembly via an external device imparts rotation to the drive assembly to selectively cause linear extension and retraction of the threaded rod assembly.

Embodiment 3. The plug removal tool of embodiment 2, wherein the central bore of the anti-rotation device comprises a round cross-sectional shape having flat truncated sides that are complementary to opposing machined flat surfaces on the threaded rod that cooperate to restrict rotational movement of the threaded rod assembly during rotation of the drive assembly.

Embodiment 4. A method of operating a plug removal tool as disclosed herein.

Embodiment 5. A method of operating a plug removal tool, comprising: providing a plug removal tool comprising: a reaction bar assembly comprising a hub having a central bore therethrough, an anti-rotation plate affixed to a bottom surface of the hub and having a central bore axially aligned with the central bore of the hub, a reaction bar comprising two substantially U-shaped rectangular bars affixed to the hub on each of a left side and a right side of the hub, and a handle disposed at least partially within and affixed to the hub; a drive assembly comprising a threaded inner bore, a nonthreaded upper bore, and a drive fitting disposed in the non-threaded upper bore, wherein the drive assembly comprises a cylindrical shape that is complementary to and comprises a clearance fit with an inner bore the handle, wherein the drive assembly is at least partially disposed within the handle and the hub and allowed to freely rotate within the handle and the hub; and a threaded rod assembly comprising a threaded rod and a plug fitting, wherein the threaded rod is threaded into the inner bore of the drive assembly and extends from the inner bore through the central bores of the hub and the anti-rotation plate; wherein rotation of the drive assembly via an external device imparts rotation to the drive assembly to selectively cause linear extension and retraction of the threaded rod assembly; threading the threaded rod assembly into a plug of a pump; inserting an external tool into the drive assembly; and operating the external device to rotate the drive assembly in a clockwise direction about a central axis to axially retract the threaded rod assembly along the central axis until the plug is removed from the pump.

Embodiment 6. The method of embodiment 5, wherein the threaded rod assembly is extracted axially along the central axis while the reaction bar assembly remains stationary with respect to the central axis.

Embodiment 7. The method of any of embodiments 5 to 6, wherein the central bore of the anti-rotation device comprises a round cross-sectional shape having flat truncated sides that are complementary to opposing machined flat surfaces on the threaded rod that cooperate to restrict rotational movement of the threaded rod assembly during rotation of the drive assembly.

This written description uses examples to disclose the embodiments, including the best mode, and to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities or features described above in the detailed description or in the examples are required, that a portion of a specific activity or feature may not be required, and that one or more further activities or features may be performed in addition to those described. Still further, the order in which activities are listed is not necessarily the order in which they are performed.

In the foregoing specification, the concepts have been described with reference to specific embodiments. However, those of ordinary skill in the art appreciate that various modifications and changes can be made without departing from the scope of the invention as set forth in the claims below. Accordingly, the specification and figures are to be regarded in an illustrative rather than in a restrictive sense, and all such modifications are intended to be included within the scope of the invention.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: (1) A is true (or present), and B is false (or not present), (2) A is false (or not present), and B is true (or present), and (3) both A and B are true (or present).

Also, the use of "a" or "an" is employed to describe elements and components described herein. This is done merely for convenience and to give a general sense of the scope of the invention. This description should be read to include one or at least one, and the singular also includes the plural unless it is obvious that it is meant otherwise.

After reading the specification, those of ordinary skill in the art will appreciate that certain features that are, for clarity, described herein in the context of separate embodiments, may also be provided in combination in a single embodiment. Conversely, various features that are, for brevity, described in the context of a single embodiment, may also be provided separately or in any subcombination. Any feature, component, element, or method steps of a preferred embodiment herein may be used with any other features, components, elements, or steps of other embodiments even if not specifically described with respect to that embodiment, unless such combination is explicitly excluded herein. Any feature, component, element, or method steps described as excluded with any particular preferred embodiment herein may similarly be excluded with any other preferred embodiment herein even if not specifically described with such embodiment. Further, references to numerical values stated in ranges include each and every value within that range and any and all subset combinations within ranges, including subsets that overlap from one preferred range to a more preferred range and even if the specific subset of the range is not specifically described herein.

What is claimed is:

1. A tool for removing or installing a plug in a fluid end of a positive displacement pump, the tool comprising:

a shaft comprising a first inner bore and a threaded bore disposed forwardly of the first inner bore, and having a first longitudinal axis;

a reaction bar disposed forwardly of the shaft and comprising a second inner bore having at least one flat surface;

a rod disposed at least partially inside the first inner bore, through the threaded bore, and at least partially forward of shaft, the rod comprising a first section extending longitudinally and adjacent to a second section, wherein the first section comprises threads configured to engage with the threaded bore and the second section comprises a flat surface configured to engage with the at least one flat surface on the second inner bore;

a drive fitting disposed at or near a rear end of the shaft, the drive fitting configured to receive a drive end of an external power tool to rotate the drive fitting and the shaft;

wherein the engagement of the first section and the threaded bore allows linear movement of the rod along the longitudinal axis when the drive fitting and the shaft are rotated; and wherein the engagement of the second section and the at least one flat surface on the second inner bore prevent rotational movement of the rod when the drive fitting and the shaft are rotated.

2. The tool of claim 1, wherein a portion of the fluid end is circular and comprises a plurality of spaced-apart studs around a circumference of the portion of the fluid end, and wherein the reaction bar is configured to engage with at least two of the spaced-apart studs to prevent movement of the reaction bar relative to the fluid end while the drive fitting and the shaft are rotated.

3. The tool of claim 2, wherein the reaction bar comprises a rectangular body configured to be disposed at a first end between a first pair of the spaced-apart studs and at a second end between a second pair of the spaced-apart studs opposite from the first pair.

4. The tool of claim 2, wherein the reaction bar comprises a rectangular body, a plate disposed between a first side of the rectangular body and a second side of the rectangular body opposite the first side, a first opening disposed between an end of the plate and a third side of the rectangular body, and a second opening disposed between another end of the plate and a fourth side the rectangular body opposite the third side.

5. The tool of claim 4, wherein the first opening is configured to receive a first of the plurality of spaced-apart studs and the second opening is configured to receive a second of the plurality of spaced-apart studs opposite the first of the plurality of spaced-apart studs.

6. The tool of claim 4, wherein the second inner bore is disposed through the plate.

7. The tool of claim 4, wherein the reaction bar further comprises a hub disposed rearwardly of the plate and at least partially inside the rectangular body; and wherein the hub comprises a third inner bore and the rod extends through the third inner bore.

8. The tool of claim 7, further comprising: a handle connected to the hub, wherein the shaft is at least partially disposed inside the handle and configured to rotate independently of the handle.

9. The tool of claim 8, wherein the hub further comprises a fourth inner bore configured to receive a forward end of the shaft and a fifth inner bore configured to receive a forward end of the handle.

10. The tool of claim 9, wherein the first inner bore, second inner bore, third inner bore, fourth inner bore, fifth inner bore, and threaded bore are all centered along the longitudinal axis.

11. The tool of claim 7, wherein the rectangular body comprises a first U-shaped bar and a second U-shaped bar disposed;

wherein the hub is disposed between the first and the second U-shaped bars; and wherein each U-shaped bar extends outwardly from the hub in a direction perpendicular to the longitudinal axis.

12. The tool of claim 1, wherein the plug comprises a female threaded portion and wherein a forward end of the rod comprises a male threaded portion configured to engage with the female threaded portion to secure the rod to the plug.

13. A plug tool, comprising:

a reaction bar assembly comprising a hub having a central bore therethrough, an anti-rotation plate affixed to a forward surface of the hub and having a central bore axially aligned with the central bore of the hub, a reaction bar comprising two U-shaped bars affixed to the hub on each of a left side and a right side of the hub, and a handle disposed at least partially within and affixed to the hub;

a drive assembly comprising a threaded inner bore, a non-threaded upper bore, and a drive fitting at least partially disposed in the non-threaded upper bore, wherein at least part of the drive assembly comprises a cylindrical shape that is complementary to and comprises a clearance fit with an inner bore of the handle, and wherein the drive assembly is at least partially disposed within the handle and the hub and allowed to freely rotate within the handle and the hub; and a threaded rod assembly comprising a threaded rod, wherein the threaded rod is threaded into the inner bore of the drive assembly and extends from the inner bore through the central bores of the hub and the anti-rotation plate;

wherein rotation of the drive assembly via an external device imparts rotation to the drive assembly to selectively cause linear extension and retraction of the threaded rod assembly.

14. The plug tool of claim 13, wherein the central bore of the anti-rotation plate comprises flat truncated sides that are complementary to opposing machined flat surfaces on the threaded rod that cooperate to restrict rotational movement of the threaded rod assembly during rotation of the drive assembly.

15. The plug tool of claim 13, wherein the central bore of the anti-rotation plate receives a pin perpendicular to a longitudinal axis of the central bore that cooperates to restrict rotational movement of the threaded rod assembly during rotation of the drive assembly.

16. The plug tool of claim 13, wherein the tool comprises a longitudinal axis and the drive assembly is configured to be rotatable around the longitudinal axis independently of the reaction bar assembly and independently of the threaded rod assembly.

17. A method of operating the plug tool of claim 13, the method comprising:

threading the threaded rod assembly into a plug of a fluid end of a pump;

inserting an external power device into the drive assembly; and operating the external power device to rotate the drive assembly in a clockwise direction about a central axis to axially retract the threaded rod assembly along the central axis until the plug is removed from the pump.

18. The method of claim 17, wherein the threaded rod assembly is extracted axially along the central axis while the reaction bar assembly remains stationary with respect to the central axis.

19. The method of claim 18, wherein the central bore of the anti-rotation plate comprises flat truncated sides that are complementary to opposing machined flat surfaces on the threaded rod that cooperate to restrict rotational movement of the threaded rod assembly during rotation of the drive assembly.

20. The method of claim 19, wherein the fluid end is circular and comprises a plurality of spaced-apart studs around the circumference of the fluid end, the method further comprising aligning the reaction bar assembly with at least two of the plurality of spaced-apart studs.

* * * * *